United States Patent [19]

Kitazaki et al.

[11] Patent Number: 5,820,979
[45] Date of Patent: Oct. 13, 1998

[54] SURFACE PROTECTIVE FILM

[75] Inventors: Yasuaki Kitazaki; Kinnosuke Hino; Syuji Ichimura, all of Tokyo, Japan

[73] Assignee: Nichiban Co., Ltd., Tokyo, Japan

[21] Appl. No.: 613,004

[22] Filed: Mar. 8, 1996

[51] Int. Cl.$^6$ ....................................... B32B 5/16
[52] U.S. Cl. .................. 428/332; 428/336; 428/339; 428/515; 428/519; 428/520; 428/521; 428/522; 428/523
[58] Field of Search ..................... 428/515, 519, 428/520, 521, 522, 523, 332, 336, 339

[56] References Cited

FOREIGN PATENT DOCUMENTS 6-14631  6/1994  Japan .
6-36682  11/1994  Japan .

*Primary Examiner*—Leszek Kiliman
*Attorney, Agent, or Firm*—Frishauf, Holtz, Goodman, Langer & Chick, P.C.

[57] ABSTRACT

Disclosed is a surface protective film which comprises:

a layer (A) comprising 60% by weight or more of a hydrogenated product of a random copolymer comprising 1 to 50% by weight of styrene and 99 to 50% by weight of diene series hydrocarbon, and 40% by weight or less of a polyolefin; and a layer (B) comprising less than 60% by weight of a hydrogenated product of a random copolymer comprising 1 to 50% by weight of styrene and 99 to 50% by weight of diene series hydrocarbon, and more than 40% by weight of a polyolefin being laminated.

10 Claims, No Drawings

SURFACE PROTECTIVE FILM

BACKGROUND OF THE INVENTION

1. Field of the Invention

This invention relates to a laminated type surface protective film one surface of which has good adhesiveness to the surfaces of a metal, a glass, a coating, etc. and also has good releasability.

2. Prior Art

Heretofore, for protecting an upper-coating surface of an automobile completed in coating, there are methods in which a paraffin wax is coated on the surface of an automobile, or a plastic film having an adhesive layer is adhered to an automobile as proposed in Japanese Provisional Patent Publications No. 188579/1989 and No. 267171/1991. However, in the former method, there are problems that function of the paraffin wax for protecting the surface is insufficient and removal thereof is troublesome. In the latter method, there are many problems that a low molecular weight component of an adhesive agent such as a resin, etc. is contained in an adhesive so that a coating film is stained and the adhesive is remained on the coating surface or the adhered portion is marked after removal of the film; and a cost is expensive since a substrate film preparation process and an adhesive coating process are separately carried out in many cases and a yield is low.

SUMMARY OF THE INVENTION

An object of the present invention is to overcome the above problems and to provide a surface protective film which has good adhesive property to the surface to be adhered, no stain nor adhered mark on the adhered surface and good releasability, and an adhering and releasing processes are simple.

The present invention relates to a surface protective film which comprises:

a layer (A) comprising 60% by weight or more of a hydrogenated product of a random copolymer comprising 1 to 50% by weight of styrene and 99 to 50% by weight of diene series hydrocarbon, and 40% by weight or less of a polyolefin; and a layer (B) comprising less than 60% by weight of a hydrogenated product of a random copolymer comprising 1 to 50% by weight of styrene and 99 to 50% by weight of diene series hydrocarbon, and more than 40% by weight of a polyolefin being laminated.

DESCRIPTION OF THE PREFERRED EMBODIMENTS

In the surface protective film of the present invention, no tackifier nor softening agent or the like having a low molecular weight is contained in the composition and a hydrogenated product of a random copolymer of styrene and a diene series hydrocarbon is used, so that the film is characterized in that it does not stain a material to be adhered, is soft and excellent in light resistance, does not remain on the surface of the material to be adhered and has releasable adhesive characteristics, and adhering and releasing processes thereof are simple. In the following, the present invention will be explained in more detail.

The hydrogenated product of a random copolymer of styrene and a diene series hydrocarbon to be used for the layer (A) or the layer (B) of the present invention comprises a styrene content of 1 to 50% by weight and preferably has a melt flow rate (measured by ASTM D1238, hereinafter referred to as "MFR") of 1 to 20 g/10 min, more preferably 2 to 15 g/10 min at 230° C. and 2.16 kg. If the amount of styrene is less than 1% by weight, thermoplasticity of the resin becomes bad, while if it exceeds 50% by weight, adhesiveness to a material to be adhered becomes bad, releasability is too light or modulus of elasticity becomes high so that the resin is not suitable as a component for the layer (A) providing adhesiveness. If the amount of styrene in the layer (B) exceeds 50% by weight, the layer is likely fused at high temperature so that heat resistance becomes bad, flexibility at low temperature is lost so that cold resistance becomes bad, and light resistance and weather resistance are lowered. As the diene series hydrocarbon, there may be mentioned, for example, isoprene, butadiene, etc. Two or more kinds of the hydrogenated products of a random copolymer of styrene and a diene series hydrocarbon may be used in combination in the respective layers and different kinds of the hydrogenated products may be used in the respective layers.

As the polyolefin to be used, there may be mentioned, for example, a polyethylene, a polypropylene, a high α-olefin resin which is a copolymer of ethylene and an α-olefin, a copolymer of ethylene and methyl methacrylate, an ionomer resin having a metal ion bonding between polymer chains mainly comprising ethylene, an ethylene-propylene-diene copolymer, a copolymer of ethylene and vinyl acetate, a copolymer of ethylene and methacrylic acid, a copolymer of ethylene and ethyl acrylate, a crystalline block copolymer of olefin crystal-ethylene-butylene-olefin crystal, a copolymer of ethylene and propylene, a copolymer of ethylene and butene-1, etc., and they are used alone or as a blend of two or more of the above, or as a polymer alloy. The above polyolefins preferably have a MFR of 0.1 to 60 g/10 min, preferably 0.5 to 30 g/10 min at 230° C. and 2.16 kg, or 0.1 to 20 g/10 min, preferably 0.5 to 15 g/10 min at 190° C. and 2.16 kg. Two or more kinds of the polyolefin may be used in combination in the respective layers and different kinds of the polyolefins may be used in the respective layers.

The amount of the hydrogenated product of a random copolymer of styrene and a diene series hydrocarbon in the layer (A) is preferably 80% by weight or more and that of the layer (B) is preferably 40% by weight or less. Also, the amount of the polyolefin in the layer (A) is preferably 20% by weight or less and that of the layer (B) is preferably 60% by weight or more. In the composition of the layer (A), if the amount of the hydrogenated product of a random copolymer of styrene and a diene series hydrocarbon is less than 60% by weight or that of the polyolefin exceeds 40% by weight, adhesiveness to a material to be adhered becomes bad, releasability is too light, modulus of elasticity becomes high or adhesion mark occurs. On the other hand, in the composition of the layer (B), if the amount of the hydrogenated product of a random copolymer of styrene and a diene series hydrocarbon is 60% by weight or more or that of the polyolefin is 40% by weight or less, blocking tendency at the back surface is remarkable whereby handing in preparation or use thereof becomes difficult.

The surface protective film of the present invention can be prepared by, for example, subjecting the layer (A) having a tackiness and comprising a hydrogenated product of a random copolymer of styrene and a diene series hydrocarbon or further a polyolefin and the layer (B) which is a support layer and comprising a polyolefin or further a hydrogenated product of a random copolymer of styrene and a diene series hydrocarbon to co-extrusion, or after the layer (B) is prepared as a film and then the layer (A) is laminated to prepare a surface protective film. As a method for preparing a film, there may be used a known method such as an inflation method, a T-die method, etc., and as a method for lamination, there may be used, for example, a dry lamination method, or a melt extrusion method or an extrusion coating method using a T-die, but in view of quality and cost, a thermal melt extrusion method is preferred. The thickness of the film may be optionally selected depending on the tackiness characteristics to be required, but generally preferably 1 to 1,000 µm, more preferably 5 to 100 µm of the layer (A) and 5 to 2,000 µm, more preferably 10 to 500 µm of the layer (B).

In the surface protective film of the present invention, if necessary, a filler or a lubricant such as talc, stearic acid amide, calcium stearate, etc.; a reinforcing agent such as an inorganic hollow particles including glass balloon, silica balloon, etc.; polymer fine particles, an antioxidant, a UV absorber, a UV stabilizer, etc., may be optionally added to the layer (A) or (B) with an amount which does not impair the objects of the present invention. More specifically, the amount of the filler or the reinforcing agent is preferably 5 to 20 parts by weight, that of the lubricant is preferably 0.1 to 0.5 part by weight that of the antioxidant or the UV absorber is preferably 0.1 to 1 part by weight, and that of the polymer fine particles is preferably 5 to 20 parts by weight based on 100 parts by weight of the resin components constituting the respective layers.

To the surface protective film of the present invention, when transparency is not particularly required to the film depending on the use, an emboss processing may be carried out at the back surface thereof, or a coloration or printing may be carried out by the addition of a pigment, a dye, etc. The surface protective film of the present invention has releasable tackiness characteristics and is usable repeatedly. Even when the tacky surface is dirty by mud, dust, etc., it can be used again after washing with water.

EXAMPLES

In the following, the present invention will be explained in more detail by referring to Examples.

Example 1

A laminated film with a total thickness of 70 µm comprising a layer (A) having a thickness of 35 µm and comprising a hydrogenated product (DYNARON 1320P, trade name, available from Nippon Synthetic Rubber Co.) of a random copolymer which comprises 10% by weight of styrene and 90% by weight of butadiene and a layer (B) having a thickness of 35 µm and comprising a polypropylene (IDEMITSU POLYPRO F-700N, trade name, available from Idemitsu Sekiyu Kagaku Co.) was subjected to co-extrusion by using a T-die film preparation machine. The layer (A)-side of the resulting laminated film was adhered to a coated surface, a stainless plate and a glass plate, and tests were carried out about adhesiveness to the material to be adhered, releasability, stained degree and presence or absence of adhesion mark after peeling off of the material to be adhered, and weathering resistance. Incidentally, the weathering resistance was carried out in a weather mether by irradiating a carbon arc for 24 hours and then releasability, stained degree and adhesion mark were inspected. The results are shown in Table 1.

Example 2

A laminated film with a total thickness of 100 µm comprising a layer (A) having a thickness of 50 µm and comprising 50% by weight of a hydrogenated product (DYNARON 1320P, trade name, available from Nippon Synthetic Rubber Co.) of a random copolymer which comprises 10% by weight of styrene and 90% by weight of butadiene, and 50% by weight of a hydrogenated product (DYNARON 1910P, trade name, available from Nippon Synthetic Rubber Co.) of a random copolymer which comprises 30% by weight of styrene and 70% by weight of butadiene, and a layer (B) having a thickness of 50 µm and comprising a polypropylene (IDEMITSU POLYPRO F-700N, trade name, available from Idemitsu Sekiyu Kagaku Co.) was subjected to co-extrusion by using a T-die film preparation machine. With regard to the resulting laminated film, tests were carried out in the same manner as in Example 1. The results are shown in Table 1.

Example 3

A laminated film with a total thickness of 120 µm comprising a layer (A) having a thickness of 60 µm and comprising 80% by weight of a hydrogenated product (DYNARON 1320P, trade name, available from Nippon Synthetic Rubber Co.) of a random copolymer which comprises 10% by weight of styrene and 90% by weight of butadiene, and 20% by weight of an ethylene-methacrylic acid copolymer (NUCREL AN4905C, trade name, available from Mitsui DuPont Chemical Co.), and a layer (B) having a thickness of 60 µm and comprising 49.8% by weight of the above hydrogenated product of the styrene-butadiene random copolymer, 50% by weight of a polypropylene (IDEMITSU POLYPRO F-700N, trade name, available from Idemitsu Sekiyu Kagaku Co.) and 0.2% by weight of stearic acid amide (available from NACALAI TESQUE Co.) was subjected to co-extrusion by using a T-die film preparation machine. With regard to the resulting laminated film, tests were carried out in the same manner as in Example 1. The results are shown in Table 1.

Comparative Example 1

A laminated film with a total thickness of 100 µm comprising a layer (A) having a thickness of 50 µm and comprising 30% by weight of a hydrogenated product (DYNARON 1320P, trade name, available from Nippon Synthetic Rubber Co.) of a random copolymer which comprises 10% by weight of styrene and 90% by weight of butadiene and 70% by weight of a polypropylene (IDEMITSU POLYPRO F-700N, trade name, available from Idemitsu Sekiyu Kagaku Co.) and a layer (B) having a thickness of 50 µm and comprising the same polypropylene was subjected to co-extrusion by using a T-die film preparation machine. With regard to the resulting laminated film, tests were carried out in the same manner as in Example 1. The results are shown in Table 1.

Comparative Example 2

A laminated film with a total thickness of 100 µm comprising a layer (A) having a thickness of 50 µm and comprising a hydrogenated product (DYNARON 1320P, trade name, available from Nippon Synthetic Rubber Co.) of a random copolymer which comprises 10% by weight of styrene and 90% by weight of butadiene and a layer (B) having a thickness of 50 µm and comprising 80% by weight of the same hydrogenated product of a styrene-butadiene random copolymer polyropylene, 19.7% by weight of a propylene (IDEMITSU POLYPRO F-700N, trade name, available from Idemitsu Sekiyu Kagaku Co.) and 0.3% by weight of stearic acid amide (available from NACALAI TESQUE Co.) was subjected to co-extrusion by using a T-die film preparation machine. However, blocking tendency of the film was remarkable so that rewinding of the film would to a roll state cannot be carried out whereby tests as a surface protective film could not be carried out.

Comparative Example 3

A laminated film with a total thickness of 100 μm comprising a layer (A) having a thickness of 50 μm and comprising 53% by weight of a hydrogenated product (DYNARON 1320P, trade name, available from Nippon Synthetic Rubber Co.) of a random copolymer which comprises 10% by weight of styrene and 90% by weight of butadiene, 23% by weight of a terpene-phenol resin (YS POLYSTAR 115, trade name, available from Yasuhara Chemical Co.) and 24% by weight of a rosin series liquid-state resin (SUPERESTER L, trade name, available form Arakawa Kagaku C.) and a layer (B) having a thickness of 50 μm and comprising a polypropylene (IDEMITSU POLYPRO F-700N, trade name, available from Idemitsu Sekiyu Kagaku Co.) was subjected to co-extrusion by using a T-die film preparation machine. With regard to the resulting laminated film, tests were carried out in the same manner as in Example 1. The results are shown in Table 1.

TABLE 1

| | Adhesiveness to the surface to be adhered | Releasability | Stain | Adhered mark | Weathering resistance |
| --- | --- | --- | --- | --- | --- |
| Example 1 | Good | Good | None | None | Good |
| Example 2 | Good | Good | None | None | Good |
| Example 3 | Good | Good | None | None | Good |
| Comparative example 1 | Bad | Good | None | Present | Good |
| Comparative example 2 | Tests cannot be carried out due to film blocking | | | | |
| Comparative example 3 | Good | Bad | Present | Present | Bad |

As can be seen from the results of Examples 1 to 3 shown in Table 1, the surface protective film according to the present invention has good adhesiveness to and releasability from a material to be adhered, and there is no stain nor adhered mark of the surface to be adhered, and weathering resistance is also excellent. Also, there is no problem in rewinding of the wound film in a roll state. Further, the preparation process of the film is simple and easy, and the film can be produced with a low cost. On the other hand, when the amount of the hydrogenated product of a random copolymer comprising styrene and diene series hydrocarbon in the layer (A) is less than 60% by weight as in Comparative example 1, adhesiveness to the surface to be adhered is not good or adhered mark remains whereby it is not suitable for a surface protective film. Also, as in Comparative example 2, when the amount of the hydrogenated product of a random copolymer comprising styrene and diene series hydrocarbon in the layer (B) is 60% by weight or more, blocking tendency is remarkable and rewinding of a wound film in a roll state cannot be carried out so that it cannot be used practically. Further, as in Comparative example 3, if a low molecular weight tackifier resin is contained in the composition for forming the layer (A), adhesiveness to the surface to be adhered is good but releasability is bad, and stain or adhered mark on the surface to be adhered is caused or weathering resistance is inferior to whereby it is not suitable as a surface protective film.

Example 4

A laminated film with a total thickness of 60 μm comprising a layer (A) having a thickness of 20 μm and comprising 70% by weight of a hydrogenated product (DYNARON 1320P, trade name, available from Nippon Synthetic Rubber Co., hardness: 39) of a random copolymer which comprises 10% by weight of styrene and 90% by weight of butadiene, and 30% by weight of a polyolefin (EVAFLEX 45X, trade name, available from Mitsui Sekiyu Kagaku Co.) comprising an ethylene-vinyl acetate copolymer (hardness: 32 measured by JIS K 6301, hereinbelow the same), and a layer (B) having a thickness of 40 μm and comprising 50% by weight of a hydrogenated product (DYNARON 1320P, trade name, available from Nippon Synthetic Rubber Co.) of a random copolymer as mentioned above, and 50% by weight of a polypropylene (IDEMITSU POLYPRO F-200S, trade name, available from Idemitsu Sekiyu Kagaku Co., modulus of elasticity: 2500 MPa) to which 0.2 part by weight of stearamide (stearic acid amide, available from NACALAI TESQUE Co.) was added based on 100 parts by weight of polymer components was subjected to co-extrusion by using a T-die film preparation machine. The layer (A)-side of the resulting laminated film was adhered to a coated surface, a stainless late and a glass plate. In this sample, the layer (A) contains a high hydrogenated product of a random copolymer amount, while the layer (B) (a base layer) contains a relatively high polyolefin amount.

The resulting film was practically used. As the results, it was found that adhesiveness, strength and body of the film were within the range of the practical use.

Comparative Example 4

A single-layered film with a thickness of 60 μm comprising 70% by weight of a hydrogenated product (DYNARON 1320P, trade name, available from Nippon Synthetic Rubber Co., hardness: 39) of a random copolymer which comprises 10% by weight of styrene and 90% by weight of butadiene, and 30% by weight of a polyolefin (EVAFLEX 45X, trade name, available from Mitsui Sekiyu Kagaku Co.) comprising an ethylene-vinyl acetate copolymer (hardness: 32) was prepared. The resulting film was adhered to a coated surface, a stainless plate and a glass plate. This sample corresponds to the layer (A) of the present invention whereby the compositional ratio of a hydrogenated product of a random copolymer is high.

The resulting film was practically used. As the results, it was found that the film has a high blocking property so that when it was wound in a roll state by co-extrusion, it could not be unwound whereby no examination as a protective film could be done. Whereas adhesiveness thereof was within the range of the practical use, but there is no body of the film so that application workability was bad. Further, strength of the film was weak so that when peeling off the film, the film was broken to pieces whereby peeling property was also bad. Anyway, it cannot be used as a protective film for practical use.

Comparative Example 5

A single-layered film with a thickness of 60 μm comprising 50% by weight of a hydrogenated product (DYNARON 1320P, trade name, available from Nippon Synthetic Rubber Co., hardness: 39) of a random copolymer which comprises 10% by weight of styrene and 90% by weight of butadiene, and 50% by weight of a polyolefin (IDEMITSU POLYPRO F-200S, trade name, available from Idemitsu Sekiyu Kagaku Co., modulus of elasticity: 2500 MPa) to which 0.2 part by weight of stearamide (stearic acid amide, available from NACALAI TESQUE Co.) was added based on 100 parts by weight of polymer components was prepared. The resulting film was adhered to a coated surface, a stainless plate and a glass plate. This sample corresponds to the layer (B) of the present invention.

The resulting film was practically used. As the results, it was found that strength and body of the film were within the range of the practical use, but adhesiveness was not good.

Therefore, when the different kinds of a hydrogenated product and a polyolefin are used in the respective layers of (A) and (B), even when the compositional ratios of the layers (A) and (B) are similar, the two-layered structure film shows remarkably different characteristics as those of the single-layered film.

We claim:

1. A surface protective film which comprises:
   a layer (A) comprising 60% by weight or more of a hydrogenated product of a random copolymer comprising 1 to 50% by weight of styrene and 99 to 50% by weight of diene series hydrocarbon, and 40% by weight or less of a polyolefin; and
   a layer (B) comprising less than 60% by weight of a hydrogenated product of a random copolymer comprising 1 to 50% by weight of styrene and 99 to 50% by weight of diene series hydrocarbon, and more than 40% by weight of a polyolefin being laminated.

2. The surface protective film according to claim 1, wherein the layer (A) and the layer (B) are laminated by a thermal melt extrusion method.

3. The surface protective film according to claim 1, wherein the layer (A) comprises 80% by weight or more of the hydrogenated product of a random copolymer, and 20% by weight or less of a polyolefin.

4. The surface protective film according to claim 1, wherein the layer (B) comprises 40% by weight or less of the hydrogenated product of a random copolymer, and 60% by weight or more of a polyolefin.

5. The surface protective film according to claim 1, wherein the hydrogenated product of a random copolymer contained in the layer (A) or (B) has a melt flow rate measured by ASTM D1238 of 1 to 20 g/10 min at 230° C. and 2.16 kg.

6. The surface protective film according to claim 1, wherein the hydrogenated product of a random copolymer contained in the layer (A) or (B) has a melt flow rate measured by ASTM D1238 of 2 to 15 g/10 min at 230° C. and 2.16 kg.

7. The surface protective film according to claim 1, wherein the polyolefin contained in the layer (A) or (B) has a melt flow rate measured by ASTM D1238 of 0.1 to 60 g/10 min at 230° C. and 2.16 kg or 0.1 to 20 g/10 min at 190° C. and 2.16 kg.

8. The surface protective film according to claim 1, wherein the polyolefin contained in the layer (A) or (B) has a melt flow rate measured by ASTM D1238 of 0.5 to 30 g/10 min at 230° C. and 2.16 kg or 0.5 to 15 g/10 min at 190° C. and 2.16 kg.

9. The surface protective film according to claim 1, wherein the layer (A) has a thickness of 1 to 1,000 μm and the layer (B) has a thickness of 5 to 2,000 μm.

10. The surface protective film according to claim 1, wherein the layer (A) has a thickness of 5 to 100 μm and the layer (B) has a thickness of 10 to 500 μm.

* * * * *